US010166825B2

(12) United States Patent
Hsu (10) Patent No.: US 10,166,825 B2
(45) Date of Patent: Jan. 1, 2019

(54) JOINT STRUCTURE FOR AN AIR VALVE

(71) Applicants:Lung-Kuo Hsu, Erlin Township, Changhua County (TW); CREATE FOREVER INDUSTRIAL CO., LTD., Erlin Township, Changhua County (TW)

(72) Inventor: Lung-Kuo Hsu, Erlin Township (TW)

(73) Assignees: Lung-Kuo Hsu, Erlin Township (TW); Create Forever Industrial Co, Ltd., Erlin Township (TW)

( * ) Notice: Subject to any disclaimer, the term of this patent is extended or adjusted under 35 U.S.C. 154(b) by 288 days.

(21) Appl. No.: 15/193,334

(22) Filed: Jun. 27, 2016

(65) Prior Publication Data

US 2017/0370510 A1    Dec. 28, 2017

(51) Int. Cl.
| | |
|---|---|
| *F16L 37/086* | (2006.01) |
| *B60C 29/00* | (2006.01) |
| *F04B 39/00* | (2006.01) |
| *F04B 39/10* | (2006.01) |
| *B60C 29/06* | (2006.01) |

(52) U.S. Cl.
CPC .............. *B60C 29/00* (2013.01); *F04B 39/00* (2013.01); *F04B 39/10* (2013.01); *F16L 37/086* (2013.01); *B60C 29/06* (2013.01)

(58) Field of Classification Search
CPC .... F16L 37/086; F16L 37/0847; F16L 37/096
USPC ............... 285/7, 312, 303, 308, 320, 317
See application file for complete search history.

(56) References Cited

U.S. PATENT DOCUMENTS

| 792,626 | A | * | 6/1905 | Stephens | F16L 19/04 |
| | | | | | 285/317 |
| 793,103 | A | * | 6/1905 | Scholtz | F16L 27/073 |
| | | | | | 285/317 |
| 4,616,859 | A | * | 10/1986 | Brunet | F16L 37/084 |
| | | | | | 285/317 |
| 5,462,380 | A | * | 10/1995 | Peek | A61G 5/12 |
| | | | | | 285/308 |
| 6,832,784 | B1 | * | 12/2004 | Chen | A47L 9/244 |
| | | | | | 285/303 |
| 7,155,774 | B2 | * | 1/2007 | Jung | A47L 9/244 |
| | | | | | 285/7 |

(Continued)

FOREIGN PATENT DOCUMENTS

CA     2549455 A1 *  5/2007  ............ F16L 37/086

*Primary Examiner* — David Bochna
(74) *Attorney, Agent, or Firm* — Alan D. Kamrath; Kamrath IP Lawfirm, P.A.

(57) ABSTRACT

A joint contains: a body, at least one locking block, at least one controller, and at least one resilient element. The body has an inlet segment, an outlet segment, and an air channel. The outlet segment has a connection orifice. Each locking block has a tooth and a driving portion. The tooth is controlled to move between a first position and a second position. Between the first position and the second position is defined a reverse driving travel path obliquely extending to the inlet segment. Each locking block also has a coupling shaft. The reverse driving travel path is arcuate, and the driving portion and the coupling shaft are on opposite sides of the tooth. Each resilient element urges the tooth to move to the first position and is pressed so that the tooth moves to the second position along the reverse driving travel path.

10 Claims, 11 Drawing Sheets

(56) References Cited

U.S. PATENT DOCUMENTS

| | | | | |
|---|---|---|---|---|
| 7,581,288 B2* | 9/2009 | Zhang | .................... | A47L 9/244 |
| | | | | 285/7 |
| 8,297,658 B2* | 10/2012 | Le Quere | ............ | F16L 37/1215 |
| | | | | 285/308 |
| 2007/0152443 A1* | 7/2007 | Cheng | ................ | F16L 37/0847 |
| | | | | 285/317 |
| 2014/0210203 A1* | 7/2014 | Lorkowsi | .............. | F16L 37/096 |
| | | | | 285/88 |

* cited by examiner

JOINT STRUCTURE FOR AN AIR VALVE

BACKGROUND OF THE INVENTION

Field of the Invention

The present invention relates to a joint connected with an air valve to fill air into a vehicle tire and, more particularly, to an air valve which is connected and is removed quickly and easily at high pressure.

Description of the Prior Art

A conventional air valve contains a check valve and is connected with a vehicle tire to fill air into the vehicle tire by using a pump, and the pump has a joint connecting with the air valve. However, when filling air into the vehicle tire, a fixing device on the joint is unlocked, so that the joint is in connection with the air valve. The fixing device is locked, so that the joint locks with the air valve, thus filling air into the vehicle tire.

The fixing device is operated troublesomely in three types as follows:

A. The fixing device is rotated tightly, and the joint has a rubber ring configured to retain the air valve. The joint does not cooperate with threads on the air valve, but its rubber ring removes easily when filling air at high pressure.

B. The joint contains female threads defined therein, and the air valve has male threads formed therein. Hence, when rotating the air valve to fill air into the vehicle tire at the high pressure, its male threads screw with the female threads of the joint. However, such a screwing manner is slow and inconvenient.

C. The joint contains threads defined thereon, so that when the joint is pressed, its threads screw with the air valve. However, such a pressing manner is operated with the user's two hands. Before or after connecting the joint with the air valve, the fixing device is locked or unlocked, thus causing a complicated and troublesome operation.

The present invention has arisen to mitigate and/or obviate the afore-described disadvantages.

SUMMARY OF THE INVENTION

The primary objective of the present invention is to provide a joint which fills air into a vehicle tire via an air valve at high pressure. When the air valve is pushed outwardly by excessive air pressure, and since a coupling shaft of each locking block is secured in a connection orifice, a tooth moves to an inlet segment in a reverse driving travel between a first position and a second position. The tooth of each locking block is pulled to the outer threads in the reverse driving travel path. Hence, the tooth of each locking block engages with the outer threads of the air valve forcefully so that the air valve does not move.

A further objective of the present invention is to provide a joint which is operated by a user's one hand easily, when connecting the joint with the air valve or removing the joint from the air valve, such as when inserting the air valve into the air channel from the outlet segment. The joint is removed from the air valve easily by pressing a manual operating portion of each controller.

Another objective of the present invention is to provide a joint in which the outlet segment of the body is flat to be applicable for air valves or vehicle tires of various sizes.

A joint provided by the present invention contains: a body, at least one locking block, at least one controller, and at least one resilient element.

The body has an inlet segment, an outlet segment, and an air channel defined between the inlet segment and the outlet segment. The outlet segment has a connection orifice.

The at least one locking block is fixed in the outlet segment of the body. Each of the at least one locking block has a tooth formed on an inner side thereof. Each locking block has a driving portion arranged on an outer side thereof. The tooth is controlled to move between a first position and a second position. Between the first position and the second position is defined a reverse driving travel path obliquely extending to the inlet segment. The first position is located in the air channel, and the second position is located outside the air channel. Each locking block also has a coupling shaft formed on one side thereof and secured in the connection orifice to produce the reverse driving travel path. The reverse driving travel of the tooth of each locking block is arcuate, and the driving portion and the coupling shaft are on opposite sides of the tooth. The tooth is close to the air channel, the driving portion is adjacent to the inlet segment, and the coupling shaft is proximate to the outlet segment.

The at least one resilient element urges the tooth of each locking block to move to the first position. When controlling the driving portion, each of the at least one resilient element is pressed so that the tooth moves to the second position along the reverse driving travel.

DETAILED DESCRIPTION OF THE PREFERRED EMBODIMENTS

The present invention will be clearer from the following description when viewed together with the accompanying drawings, which show, for purpose of illustration only, the preferred embodiments in accordance with the present invention.

Referring to FIGS. 1-5, a joint structure for an air valve according to a first embodiment of the present invention comprises a joint 1 which is connected with an air valve 2 to fill air into a vehicle tire (not shown). The air valve 2 includes outer threads 2A defined around an outer peripheral side thereof. The joint 1 includes: a body 10, a stop ring 20, at least one locking block 30, at least one controller 40, and at least one resilient element 50, 60.

The body 10 has a first casing 101 and a second casing 102 connected with the first casing 101, and the body 10 also has an inlet segment 11 and an outlet segment 12. The inlet segment 11 is coupled with an air supply source and is circular, and the outlet segment 12 is flat defining a plane including two first lines 121 and two second lines 122 extending between the two first lines 121. Between the inlet segment 11 and the outlet segment 12 is defined an air channel 13 to flow air. Along at least one of the two second lines 122, the outlet segment 12 has an connection orifice 14. Between the inlet segment and the outlet segment 12 is defined a groove 15. The air channel 13 has a pushing portion 16 formed therein, and the pushing portion 16 does not stop the air channel 13 between the inlet segment 11 and the outlet segment 12. In addition, one end of the air valve 2 inserts into the air channel 13 from the outlet segment 12.

The stop ring 20 is mounted in the air channel 13 and does not stop the air flowing between the inlet segment 11 and the outlet segment 12. When the one end of the air valve 2 inserts into the outlet segment 12, a check valve (not shown) of the air valve 2 is pressed by the pushing portion 16 to turn on. The one end of the air valve 2 abuts against the stop ring 20, so that the air flows smoothly among the air valve 2, the air channel 13 and the inlet segment 11, and external air does not flow into the air valve 2.

Figure 1:
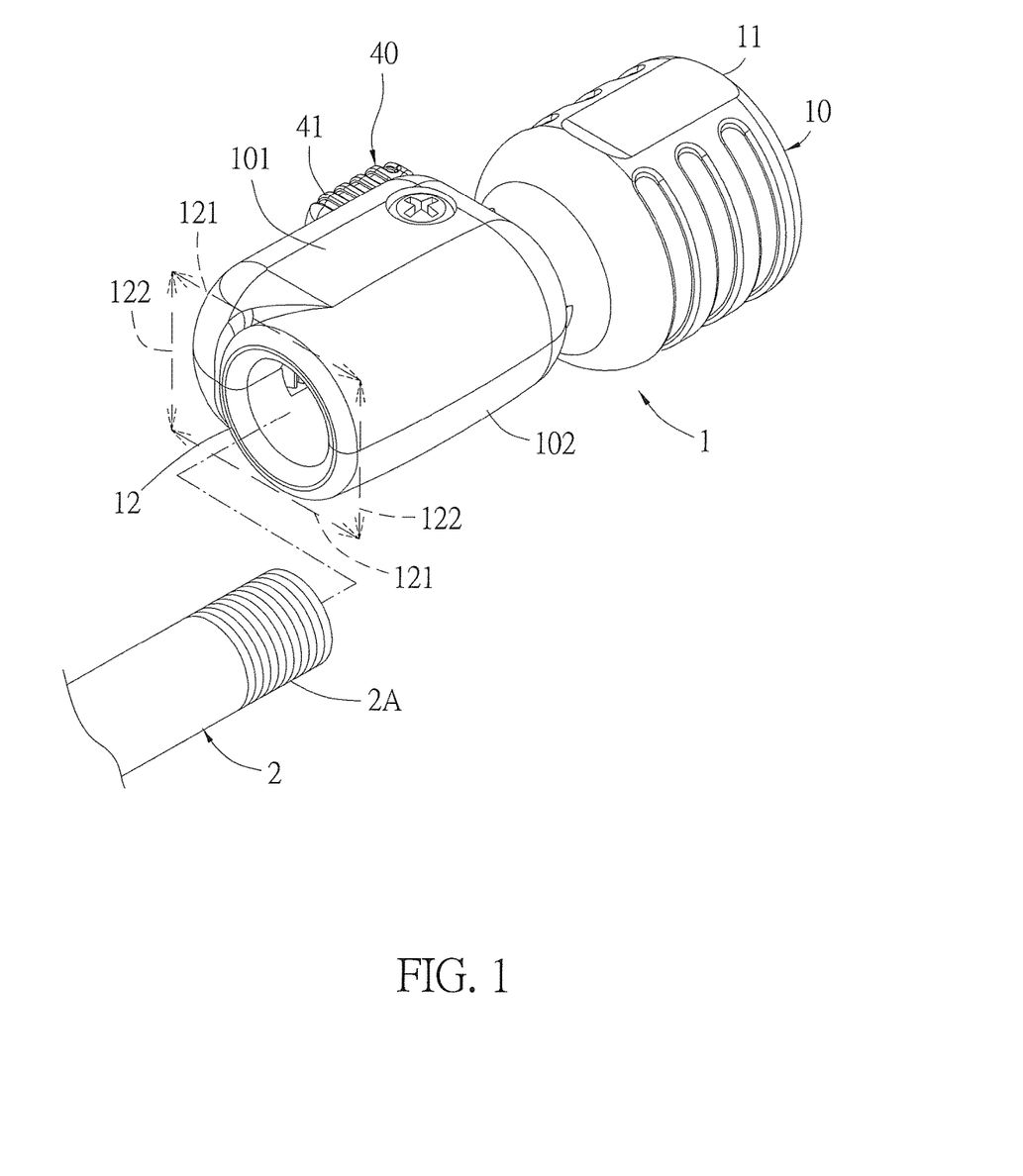
FIG. 1 is a perspective view showing the application of a joint according to a first embodiment of the present invention.
Figure 2:
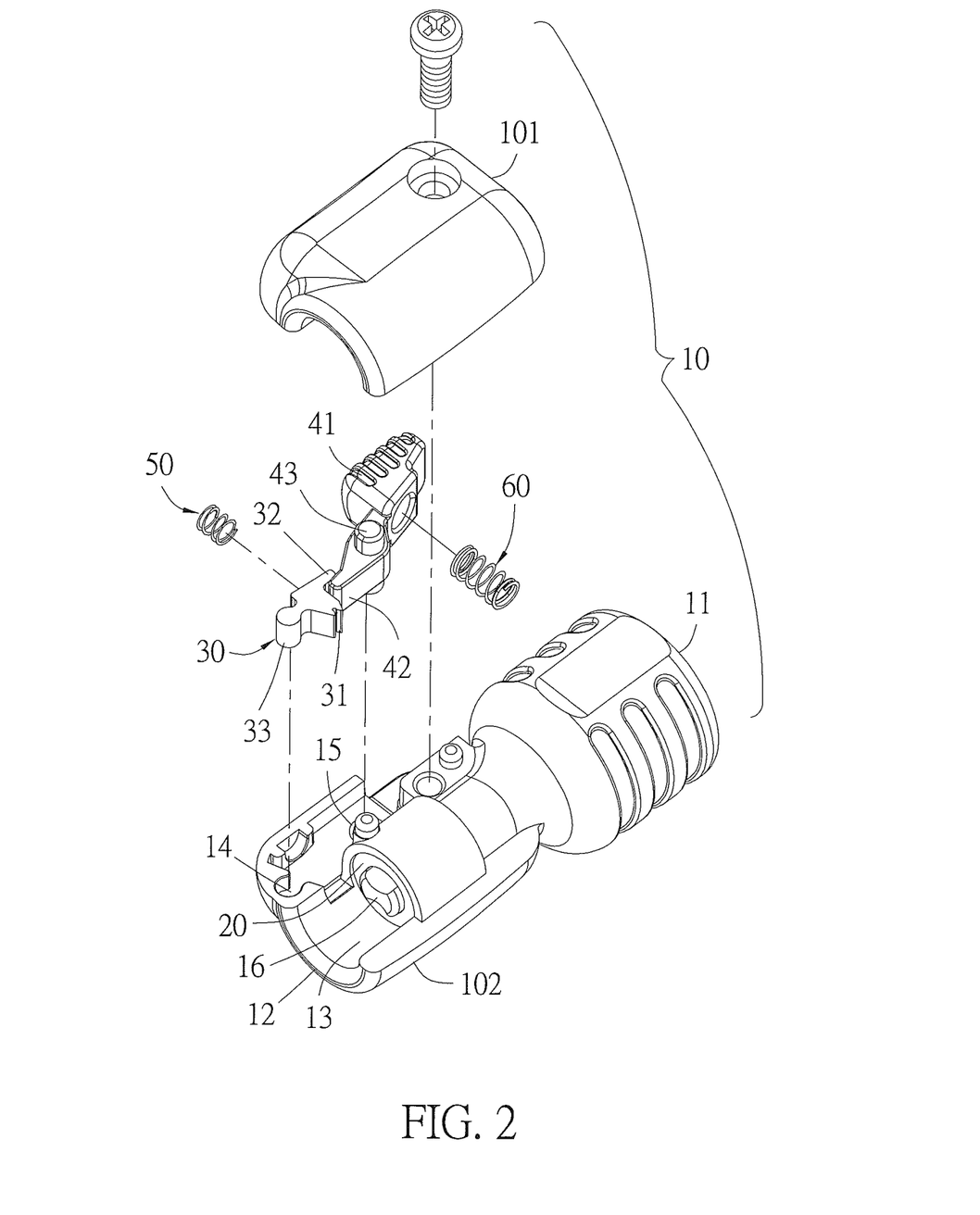
FIG. 2 is a perspective view showing the exploded components of the joint according to the first embodiment of the present invention.
Figure 3:
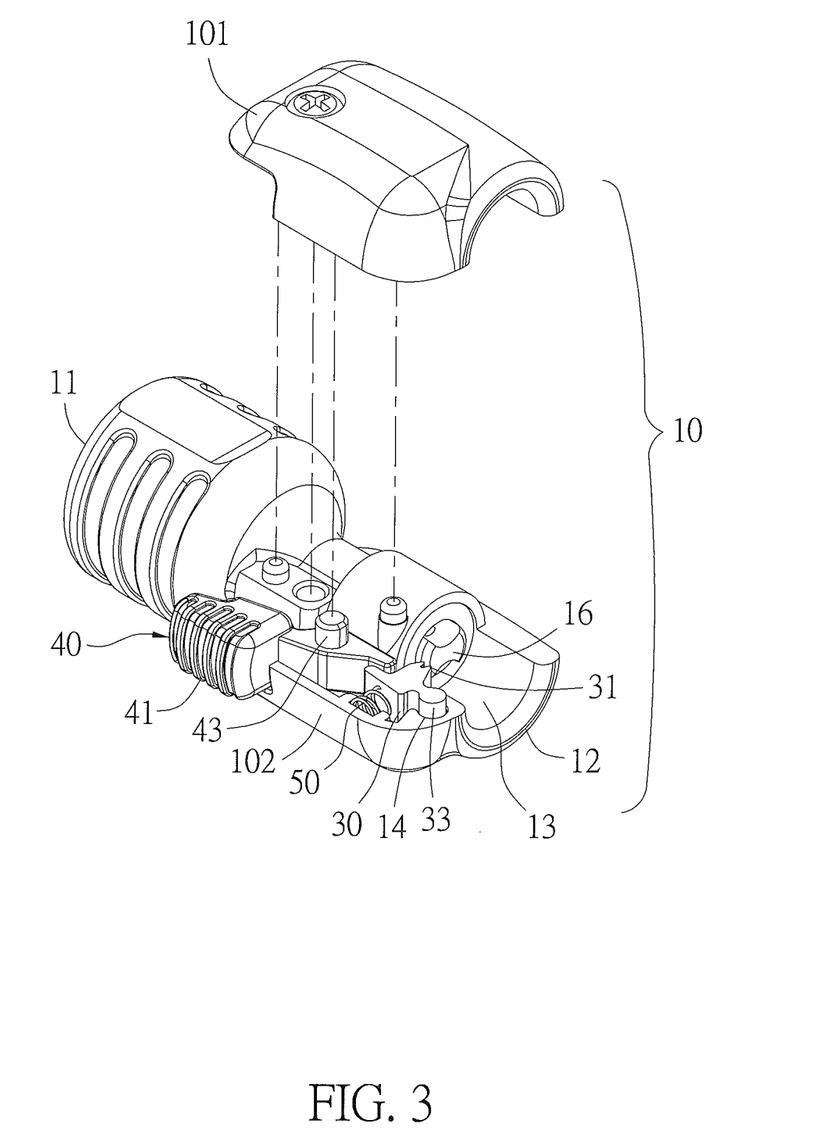
FIG. 3 is a perspective view showing the exploded components of a part of the joint according to the first embodiment of the present invention.
Figure 4:
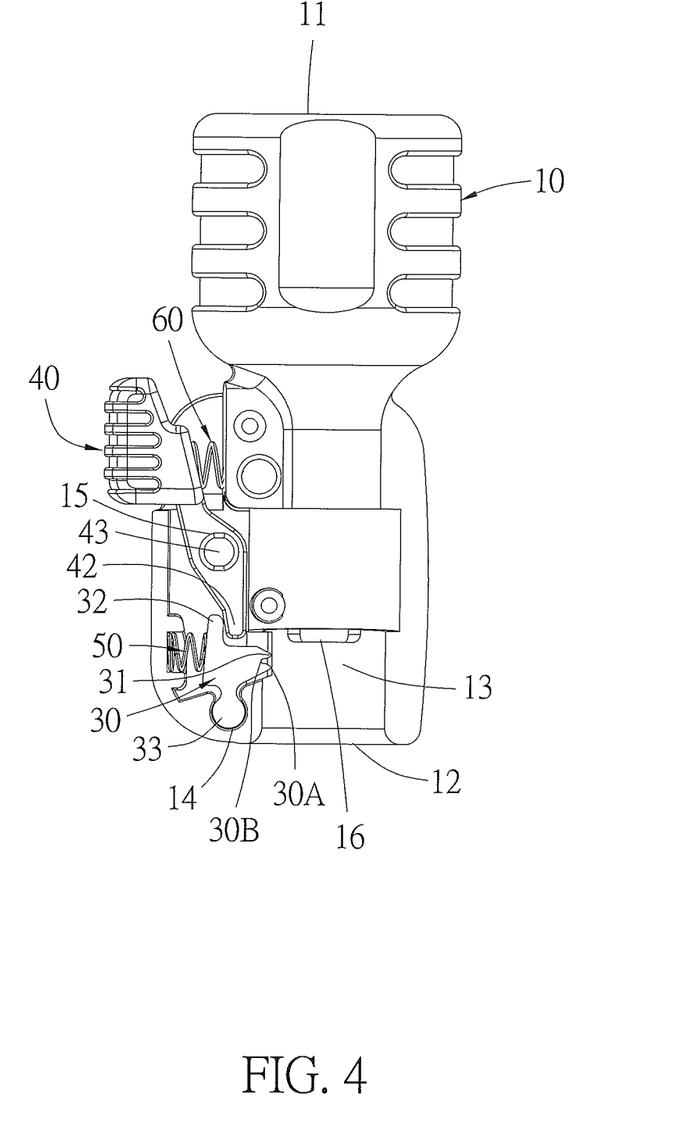
FIG. 4 is a side plane view showing the operation of the joint according to the first embodiment of the present invention.
Figure 5:
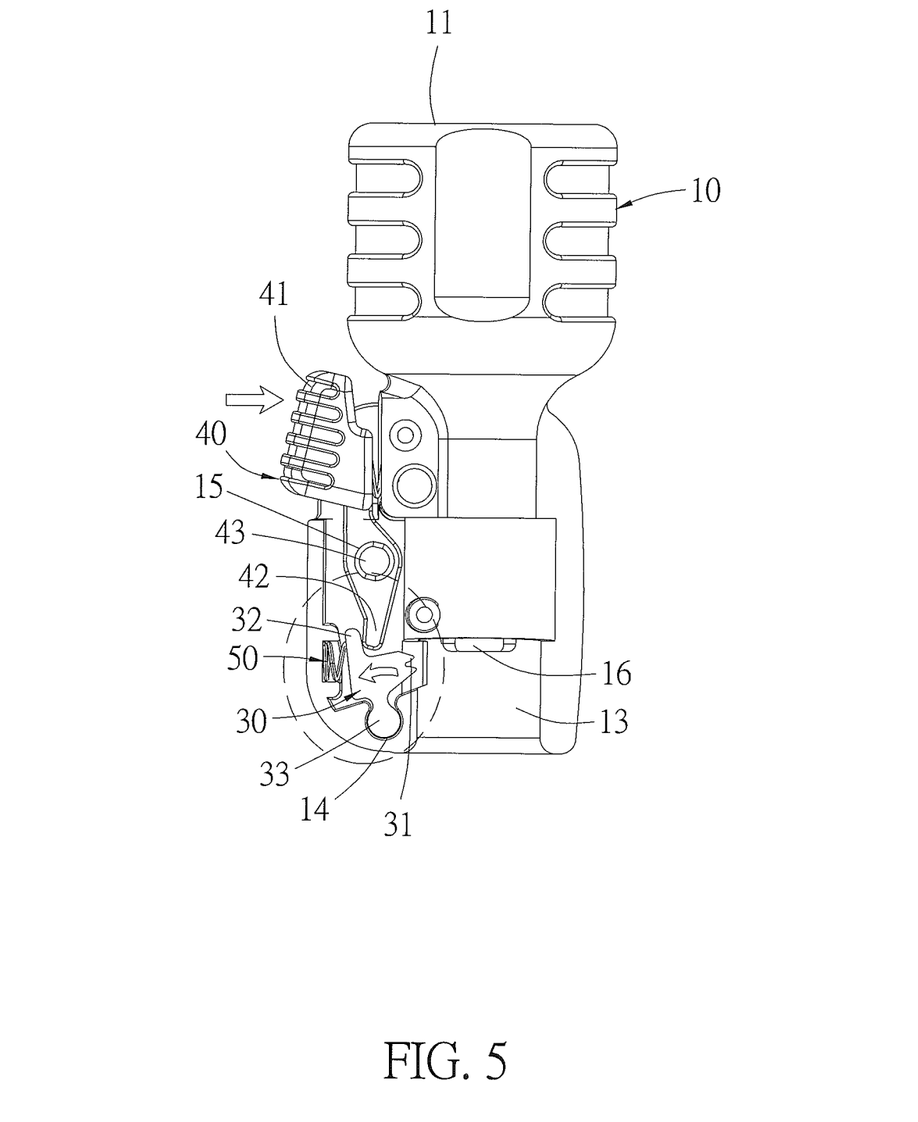
FIG. 5 is another side plane view showing the operation of the joint according to the first embodiment of the present invention.
Figure 6:
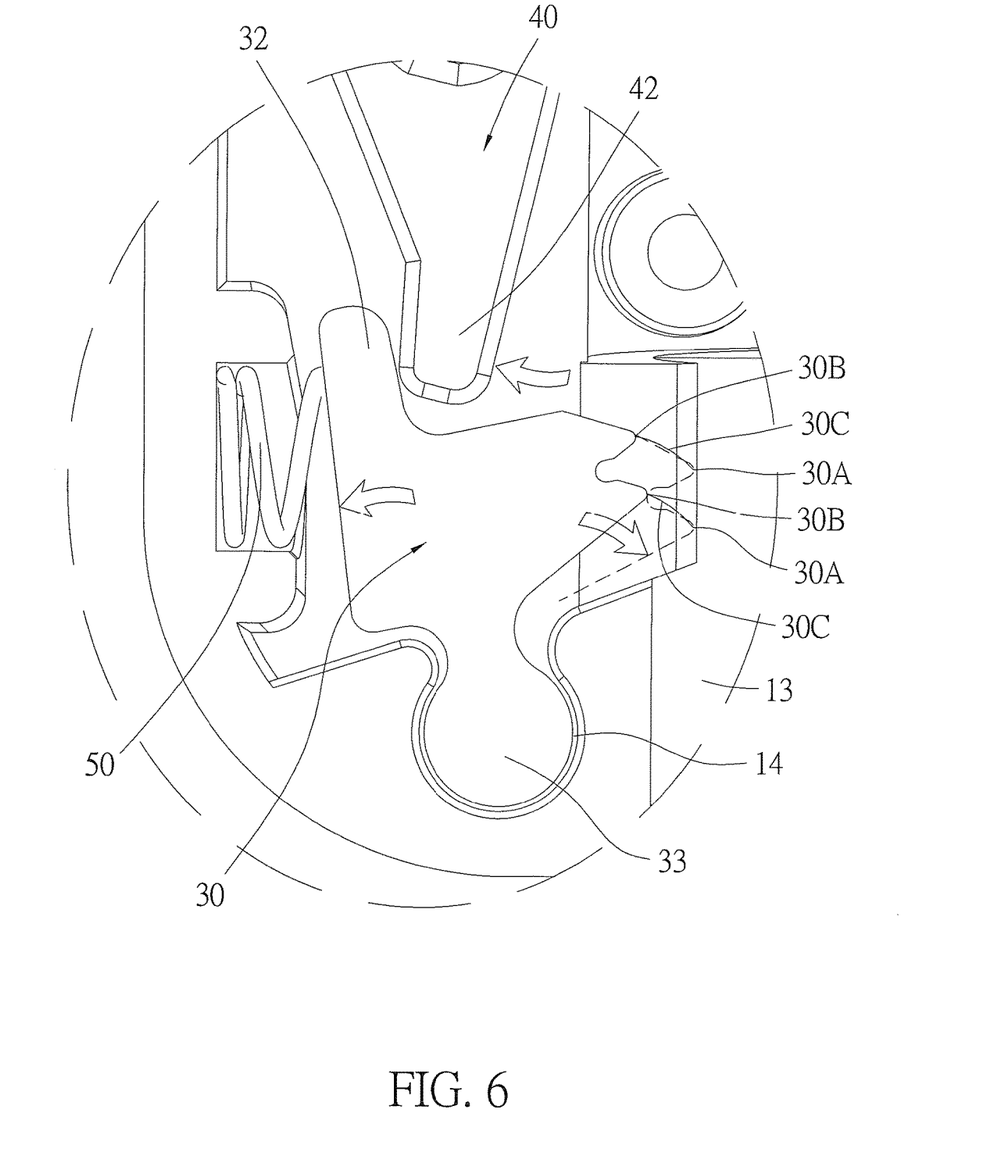
FIG. 6 is an amplified perspective view showing the assembly of a part of the joint according to the first embodiment of the present invention.
Figure 11:
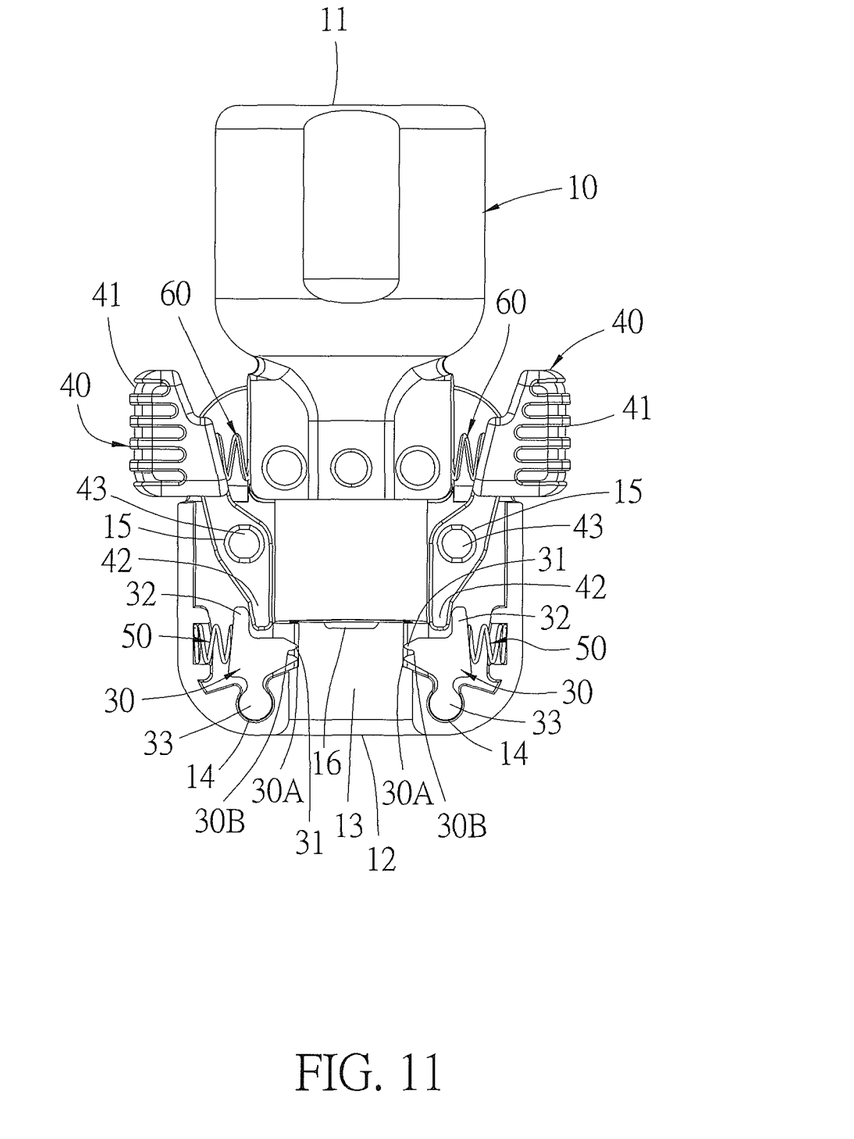
FIG. 11 is a side plane view showing the assembly of a joint according to a third embodiment of the present invention.

As shown in FIGS. 1 to 5, one of the at least one locking block 30 is applied in the joint 1. As illustrated in FIG. 11, two of the at least one locking block 30 are applied in the joint 1, and the two locking blocks 30 are arranged on the two second lines 122 of the body 10. Each locking block 30 has a tooth 31 formed on an inner side thereof and has a driving portion 32 arranged on an outer side thereof. The tooth 31 is controlled to move between a first position 30A and a second position 30B (as shown in FIGS. 5 and 6). Between the first position 30A and the second position 30B is defined a reverse driving travel path 30C obliquely extending to the inlet segment 11, and the reverse driving travel path 30C is arcuate. The first position 30A is located in the air channel 13, and the second position 30B is located outside the air channel 13. Each locking block 30 also has a coupling shaft 33 formed on one side thereof and secured in the connection orifice 14 to produce the reverse driving travel path 30C, and the driving portion 32 and the coupling shaft 33 are on opposite sides of the tooth 31. The tooth 31 is close to the air channel 13, the driving portion 32 is adjacent to the inlet segment 11, and the coupling shaft 33 is proximate to the outlet segment 12. Hence, the first position 30A, the second position 30B, and the reverse driving travel path 30C are defined.

As shown in FIGS. 1 to 5, one of the at least one controller 40 is applied in the joint 1. As illustrated in FIG. 11, two of the at least one controller 40 are employed in the joint 1, and the two controllers 40 are arranged on the second lines 122 of the body 10. Each controller 40 has a manual operation portion 41 defined on an outer side thereof and has a controlling portion 42 arranged on an inner side thereof to mate with the driving portion 32. When the manual operation portion 41 is pressed, the controlling portion 42 actuates the driving portion 32 to move outwardly, so that the tooth 31 moves between the first position 30A and the second position 30B. Furthermore, each controller 40 also has a coupling column 43 inserted into the groove 15 to define a travel movement, after pressing the manual operation portion 41.

As shown in FIGS. 1 to 5, two of the at least one resilient element 50, 60 are applied in the joint 1. As illustrated in FIG. 11, two of the at least one controller 40 are employed in the joint 1, and four resilient elements 50, 60 are fixed among the body 10, the at least one controller 40, and the at least one locking block 30, so that the tooth 31 of each locking block 30 is located at the first position 30A. When pressing the manual operation portion 41 of each controller 40, the resilient element 50 is forced by the manual operation portion 41, so that the tooth 31 moves to the second position 30B along the reverse driving travel path 30C.

Figure 7:
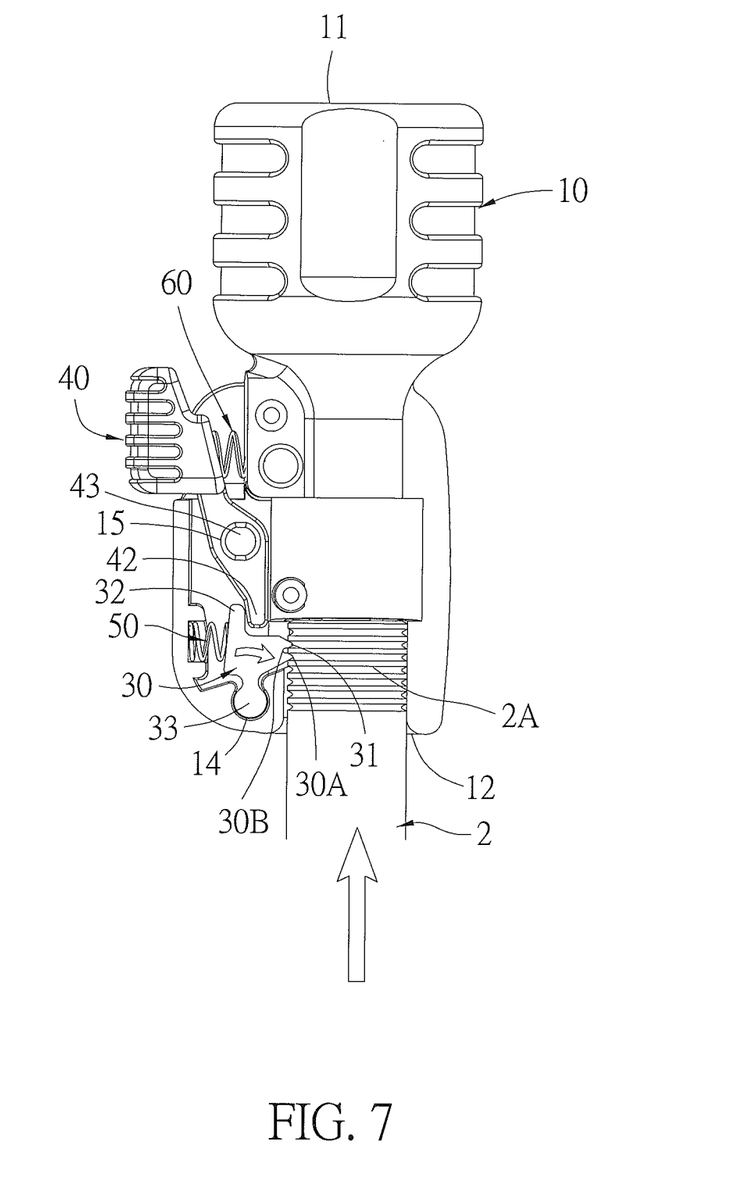
FIG. 7 is a side plane view showing the operation of the joint according to the first embodiment of the present invention.
Figure 8:
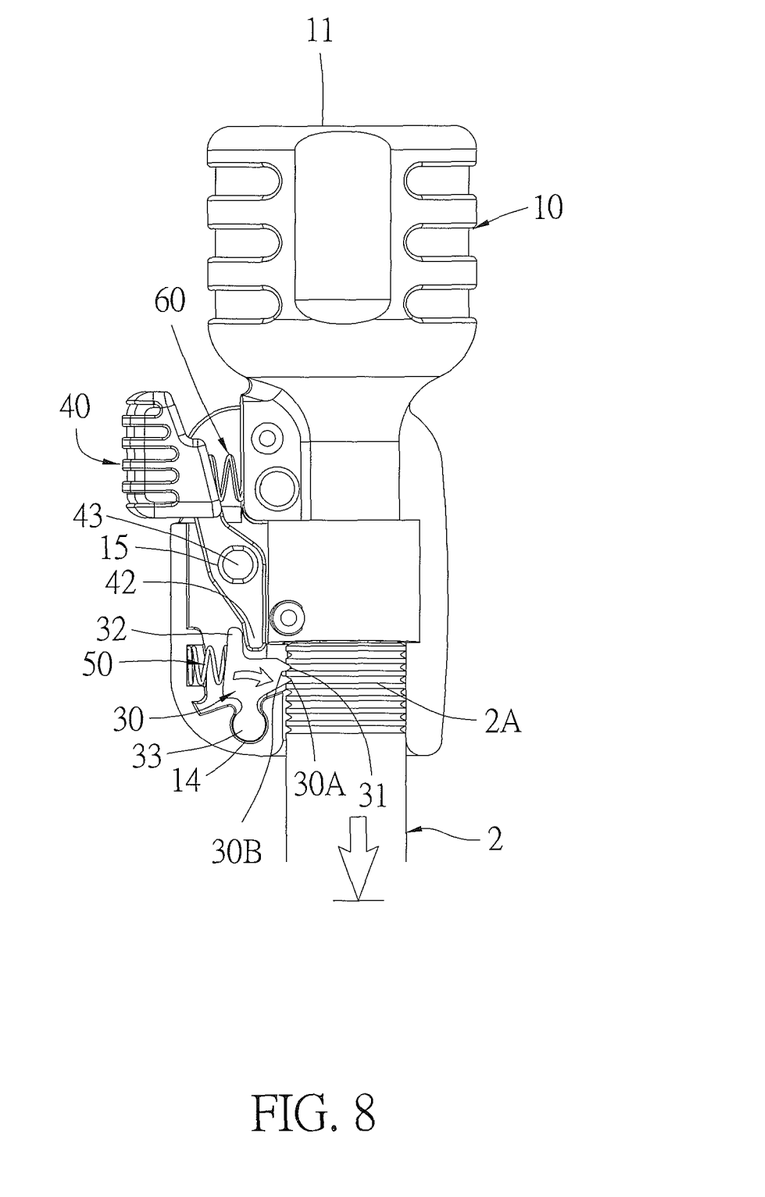
FIG. 8 is another side plane view showing the operation of the joint according to the first embodiment of the present invention.
Figure 9:
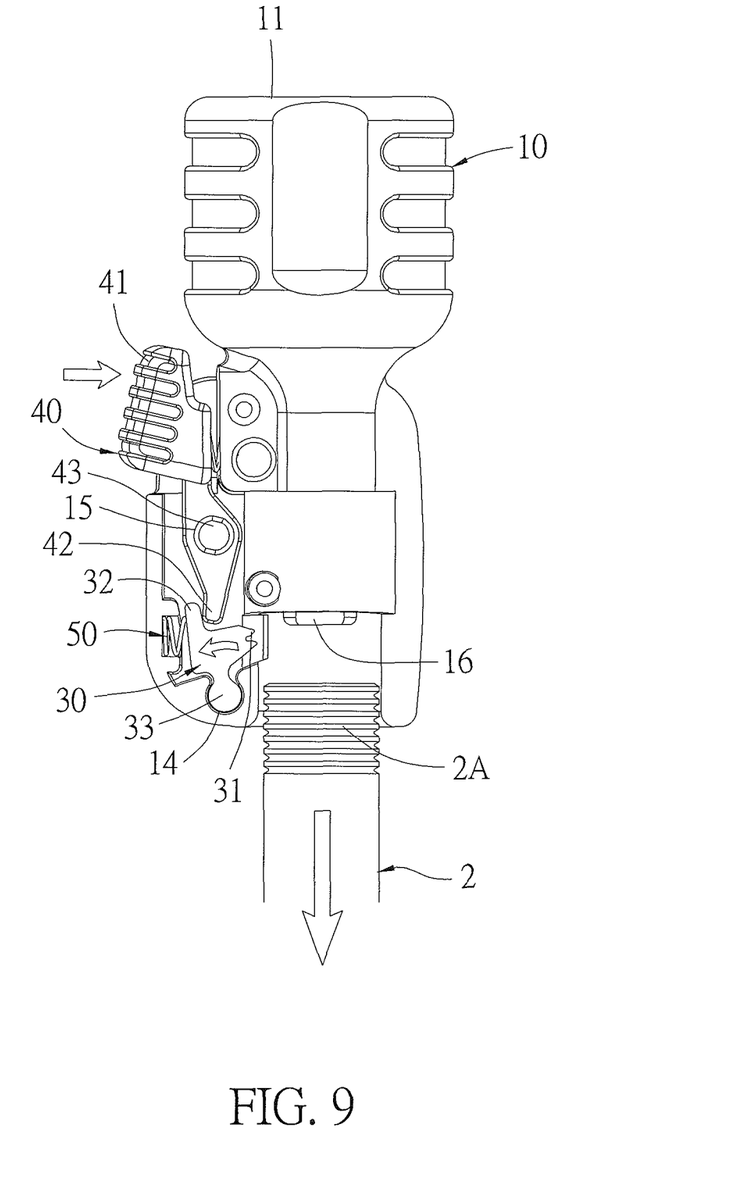
FIG. 9 is also another side plane view showing the operation of the joint according to the first embodiment of the present invention.

Referring to FIGS. 7 to 9, when desiring to connect the joint 1 and the air valve 2 together to fill air into the vehicle tire (not shown), the air valve 2 is inserted into the air channel 13 from the outlet segment 12 by the user's one hand, and the tooth 31 of each locking block 30 is pushed by the outer threads 2A to rotate and be removed in the reverse driving travel path 30C. Hence, the air valve 2 is inserted into the air channel 13 continuously, the check valve (not shown) of the air valve 2 is pushed by the pushing portion 16 to turn on, and the stop ring 20 abuts against the one end of the air valve 2. Thus, the air flows among the air valve 2, the air channel 13, and the inlet segment 11, and the external air does not flow into the air valve 2. Preferably, the air is fed into the air valve 2 from the inlet segment 11, and the outer threads 2A of the air valve 2 engage with the tooth 31 of each locking block 30 at the first position 30A by inserting the air valve 2 into the air channel 13 from the outlet segment 12.

When each controller 40 is not pressed and the air valve 2 is removed or is pushed outwardly by excessive air pressure, as shown in FIG. 8, the tooth 31 of each locking block 30 is pulled to the outer threads 2A to engage with the air valve 2 securely.

With reference to FIG. 9, the manual operation portion 41 of each controller 40 is pressed by the user's one hand after filling the air into the vehicle tire, and each controller 40 presses the resilient element 60 and its controlling portion 42 rotates along the coupling column 43. Thus, the controlling portion 42 actuates the driving portion 32 of each locking block 30, and the tooth 31 moves to the second position 30B from the first position 30A along the reverse driving travel path 30C. Hence, the joint 1 is removed from the air valve 2.

Figure 10:
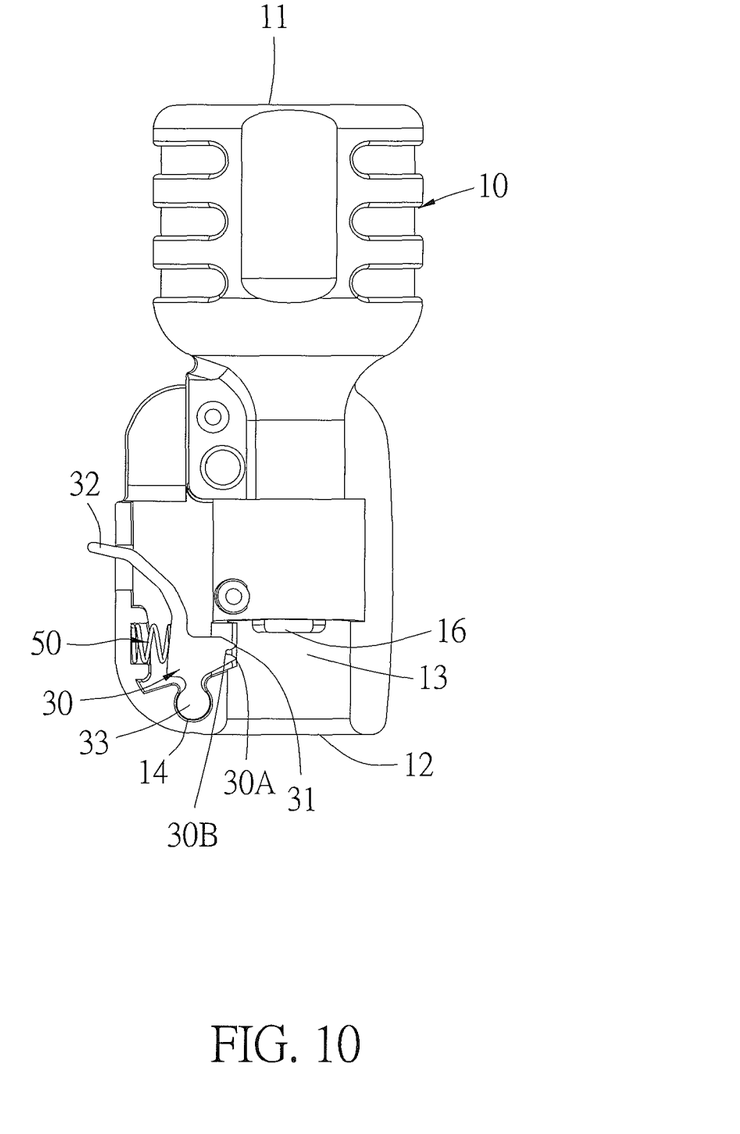
FIG. 10 is a side plane view showing the assembly of a joint according to a second embodiment of the present invention.

Referring to FIG. 10, when the controller 40 is not provided with the joint 1, the driving portion 32 extends outwardly from each locking block 30 to be controlled manually. For example, when the driving portion 32 of each locking block 30 is controlled manually, the resilient element 50 is pressed so that the tooth 31 moves between the first position 30A and the second position 30B.

Thereby, the joint 1 of the present invention contains advantages as follows:

1. The joint 1 fills air into the vehicle tire via the air valve 2 at high pressure. When the air valve 2 is pushed outwardly by the excessive air pressure, and since the coupling shaft 33 of each locking block 30 is secured in the connection orifice 14, the tooth 31 moves to the inlet segment 11 in the reverse driving travel path 30C between the first position 30A and the second position 30B, and the tooth 31 of each locking block 30 is pulled to the outer threads 2A in the reverse driving travel path 30C. Hence, the tooth 31 of each locking block 30 engages with the outer threads 2A of the air valve 2 forcefully, so that the air valve 2 cannot be removed.

2. The joint 1 is operated by the user's one hand easily, when connecting the joint 1 with the air valve 2 or removing the joint 1 from the air valve 2, such as when inserting the air valve 2 into the air channel 13 from the outlet segment 12. Also, the joint 1 is removed from the air valve 2 easily by pressing the manual operation portion 41 of each controller 40.

3. The outlet segment 12 of the body 10 is flat to be applicable for air valves 2 or vehicle tires of various sizes.

While various embodiments in accordance with the present invention have been shown and described, it is clear to those skilled in the art that further embodiments may be made without departing from the scope of the present invention.

What is claimed is:

1. A joint comprising:
a body having an inlet segment, an outlet segment, and an air channel defined between the inlet segment and the outlet segment, wherein the outlet segment has a connection orifice;
at least one locking block fixed in the outlet segment of the body, with each of the at least one locking block having a tooth formed on an inner side thereof, with each locking block having a driving portion arranged on an outer side thereof, wherein the tooth is controlled to move between a first position and a second position, wherein between the first position and the second position is defined a reverse driving travel path obliquely extending to the inlet segment, wherein the first position is located in the air channel, wherein the second position is located outside the air channel, wherein each locking block also has a coupling shaft formed on one side thereof and secured in the connection orifice to produce the reverse driving travel path, wherein the reverse driving travel path of the tooth of each locking block is arcuate, wherein the driving portion and the coupling shaft are on opposite sides of the tooth, wherein the tooth is close to the air channel, the driving portion is adjacent to the inlet segment, and the coupling shaft is proximate to the outlet segment; and
at least one resilient element urging the tooth of each locking block to move to the first position, and wherein when controlling the driving portion, each of the at least one resilient element is pressed so that the tooth moves to the second position along the reverse driving travel path.

2. The joint as claimed in claim 1 further comprising at least one controller, wherein between the inlet segment and the outlet segment of the body is defined a groove, wherein each of the at least one controller is arranged on the outlet segment of the body, wherein each controller has a manual operation portion defined on an outer side thereof and has a controlling portion arranged on an inner side thereof to mate with the driving portion, wherein when the manual operation portion is pressed, the controlling portion actuates the driving portion to move outwardly so that the tooth moves between the first position and the second position, wherein each controller has a coupling column inserted into the groove to define a travel movement after pressing the manual operation portion, and wherein the at least one resilient element is fixed between the body and the at least one controller, and between the body and the at least one locking block.

3. The joint as claimed in claim 2, wherein the at least one resilient element is fixed between the body and the at least one locking block.

4. The joint as claimed in claim 2, wherein the at least one resilient element is fixed between the body and the at least one controller.

5. The joint as claimed in claim 2, wherein the at least one resilient element is fixed between the body and the at least one controller and between the body and the at least one locking block.

6. The joint as claimed in claim 1, wherein the outlet segment of the body is flat defining a plane including two first lines and two second lines extending between the two first lines.

7. The joint as claimed in claim 6, wherein the at least one locking block is arranged on one of the two second lines of the body, and wherein the at least one controller is arranged on one of the two second lines of the body.

8. The joint as claimed in claim 1, wherein the air channel has a pushing portion formed therein, and wherein the pushing portion does not stop the air channel between the inlet segment and the outlet segment.

9. The joint as claimed in claim 1, further comprising a stop ring mounted in the air channel and which does not stop air flowing between the inlet segment and the outlet segment.

10. The joint as claimed in claim 1, wherein the body also has a first casing and a second casing.

* * * * *